June 10, 1958  W. E. WILSON  2,838,022
SPHERICAL WATER CRAFT

Filed March 30, 1956  4 Sheets-Sheet 1

INVENTOR.
WAYNE E. WILSON,
BY
McMorrow, Berman + Davidson
ATTORNEYS.

June 10, 1958  W. E. WILSON  2,838,022
SPHERICAL WATER CRAFT
Filed March 30, 1956  4 Sheets-Sheet 2

INVENTOR.
WAYNE E. WILSON,
BY
McMorrow, Berman + Davidson
ATTORNEYS.

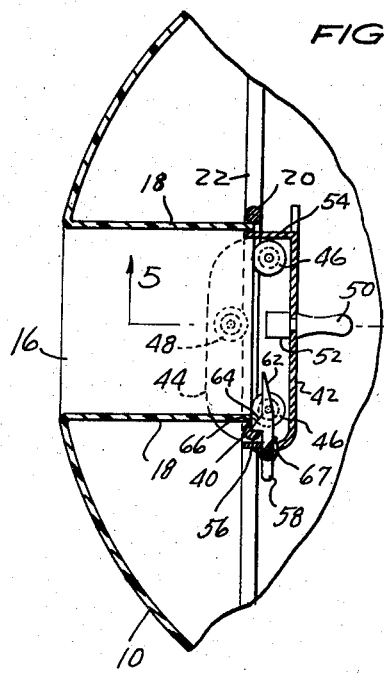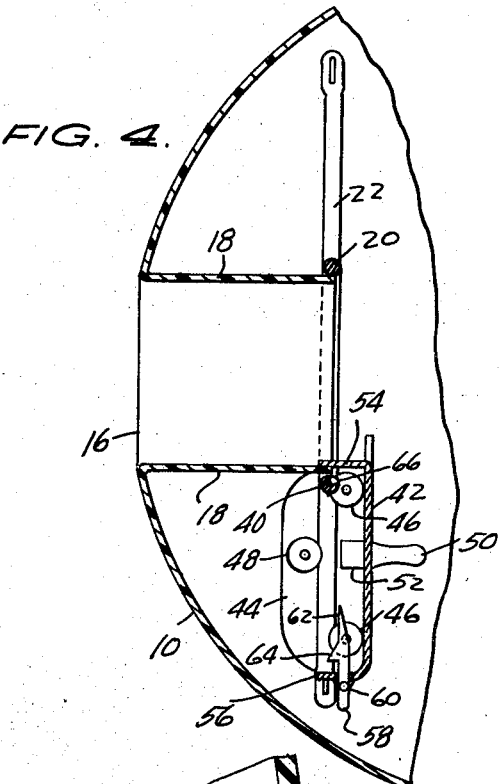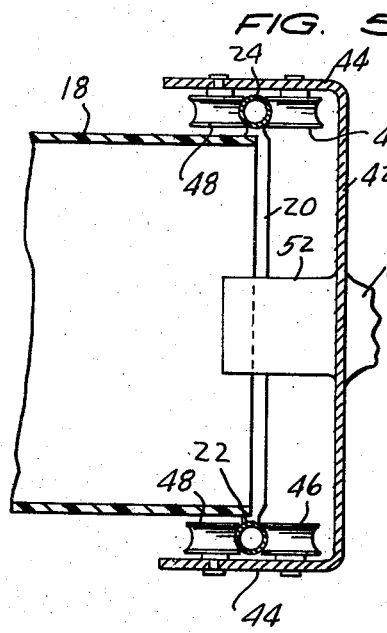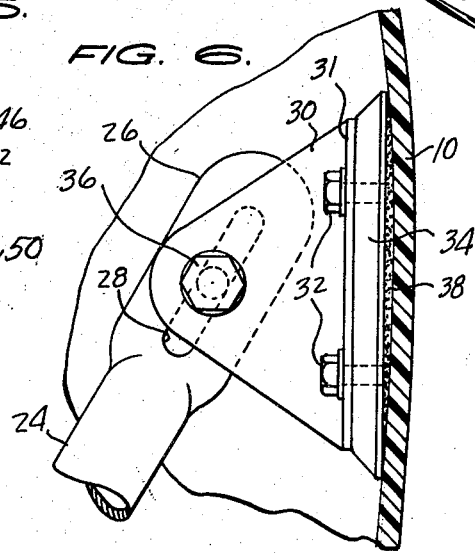

June 10, 1958 W. E. WILSON 2,838,022
SPHERICAL WATER CRAFT
Filed March 30, 1956 4 Sheets-Sheet 4
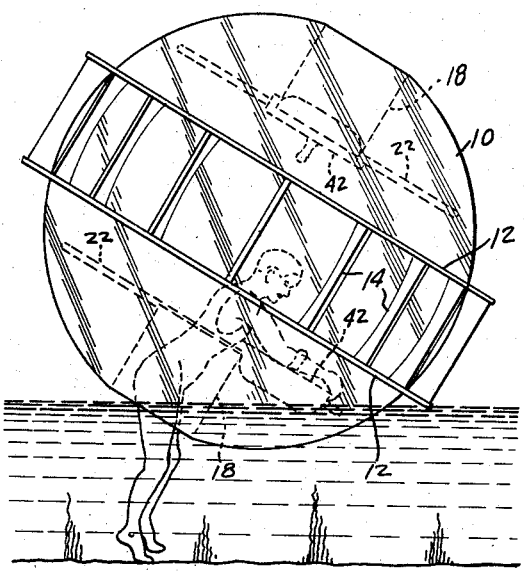
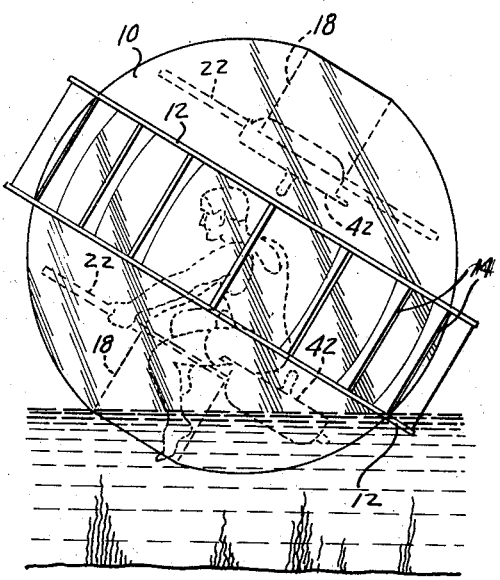
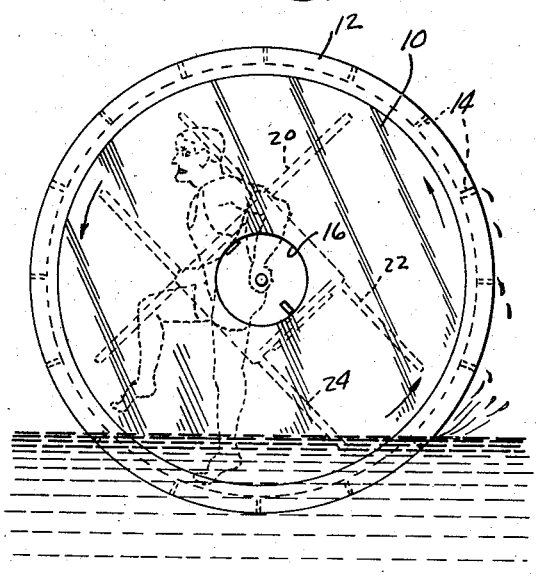
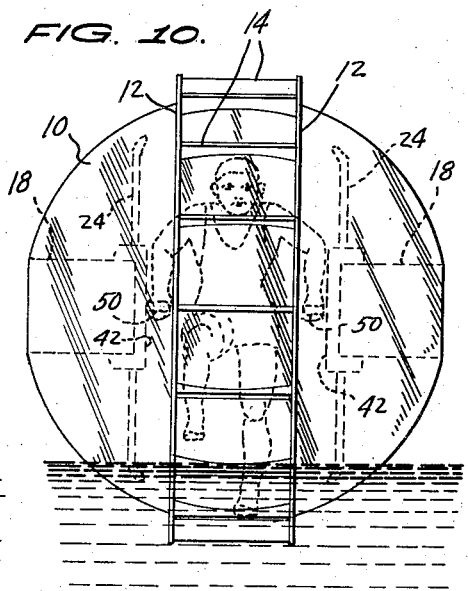
INVENTOR.
WAYNE E. WILSON,
BY
McMorrow, Berman & Davidson
ATTORNEYS.

United States Patent Office 2,838,022
Patented June 10, 1958

2,838,022

SPHERICAL WATER CRAFT

Wayne E. Wilson, York, Pa.

Application March 30, 1956, Serial No. 575,223

7 Claims. (Cl. 115—20)

This invention relates to water craft, and more particularly has reference to a hollow sphere or other symmetrical structure buoyantly supported upon the surface of the water, and so designed that a person within the sphere can, by a walking motion, cause the sphere to move forwardly or rearwardly, as desired, while at the same time maintaining the sphere under control such as to permit the craft to turn left or right in a selected direction.

Summarized briefly, the invention comprises a spherical hull, having diametrically opposed hatches or entranceways aligned coaxially with one another in a line extending diametrically of the sphere, said hatches being formed as tubular members extending inwardly of the hull. Slidably mounted within the hull for movement into open and closed positions across the tubular members are closure plates having handles, so that a user, standing within the hull between the closure plates, can grasp the handles and, by a natural walking motion, effect rotational movement of the sphere. On the exterior of the hull there is provided an annular series of paddles, rigid with the hull, adapted to effect forward or backward motion, as the case may be, of the hull responsive to said walking motion of the user within the hull.

One important object is to provide a device of the nature referred to which will, in effect, permit one to "walk on water," so to speak, that is, the person standing within the hull is supported for the greatest part of his height above the water level, and by a walking motion can cause the hull to move forwardly upon the water in a selected direction.

Another object is to so design the device as to permit a person to use the same for observing marine life, due to the fact that a transparent portion of the hull which is in contact with the water provides a window permitting observation of submarine life and landscape without the usual surface reflection and refraction which ordinarily interferes with such observation.

Another object is to provide a device of the nature referred to which can be used for fishing, with the hatchways providing openings through which one may fish, under circumstances that will increase the enjoyment of the fishing due to the above mentioned characteristic permitting full observation of marine life.

Still another object is to form a spherical water vehicle that is particularly adapted to afford the user amusement as well as exercise, through a design such as to render the device adaptable for "foot racing" and "walking" on water, as well as for surf riding.

Yet another object is to form a spherical vessel which will be particularly designed to be safe in use, thus to be attractive to persons otherwise having a fear of aquatic sports and exercises.

Still another object is to provide a spherical vessel of the nature described which will include an unobstructed area above the water level, thus to permit the user to observe the orientation of the sphere with respect to the shore and other surface objects, thus providing a ready basis for judging the desirability of a change in location.

Yet another object is to provide a spherical vessel of the type referred to, the forward motion of which can be caused by an expenditure of effort no greater than that required for ordinary walking.

Other objects will appear from the following description, the claims appended thereto, and from the annexed drawing, in which like reference characters designate like parts throughout the several views, and wherein:

Figure is an elevational view of a spherical vessel formed according to the present invention;

Figure 3 is a sectional view through one of the hatchways with its associated closure plate in closed position, taken on line 3—3 of Figure 2;

Figure 4 is a sectional view on the same cutting plane as Figure 3, with the closure plate in open position;

Figure 5 is a sectional view through the closure plate on an enlarged scale, taken on line 5—5 of Figure 3;

Figure 6 is a detail sectional view, the scale being enlarged still further, taken on line 6—6 of Figure 2;

Figure 7 is a reduced elevational view of the sphere in use, with the user entering the sphere;

Figure 8 is a view similar to Figure 7 in which the user has entered the sphere but has not yet assumed the position required for effecting forward or rearward motion of the sphere;

Figure 9 is a view similar to Figure 7 in which the user is effecting forward motion of the sphere by a walking action; and Figure 10 is a view of the sphere during the forward motion thereof, as seen from the left of Figure 9.

Figure 1:
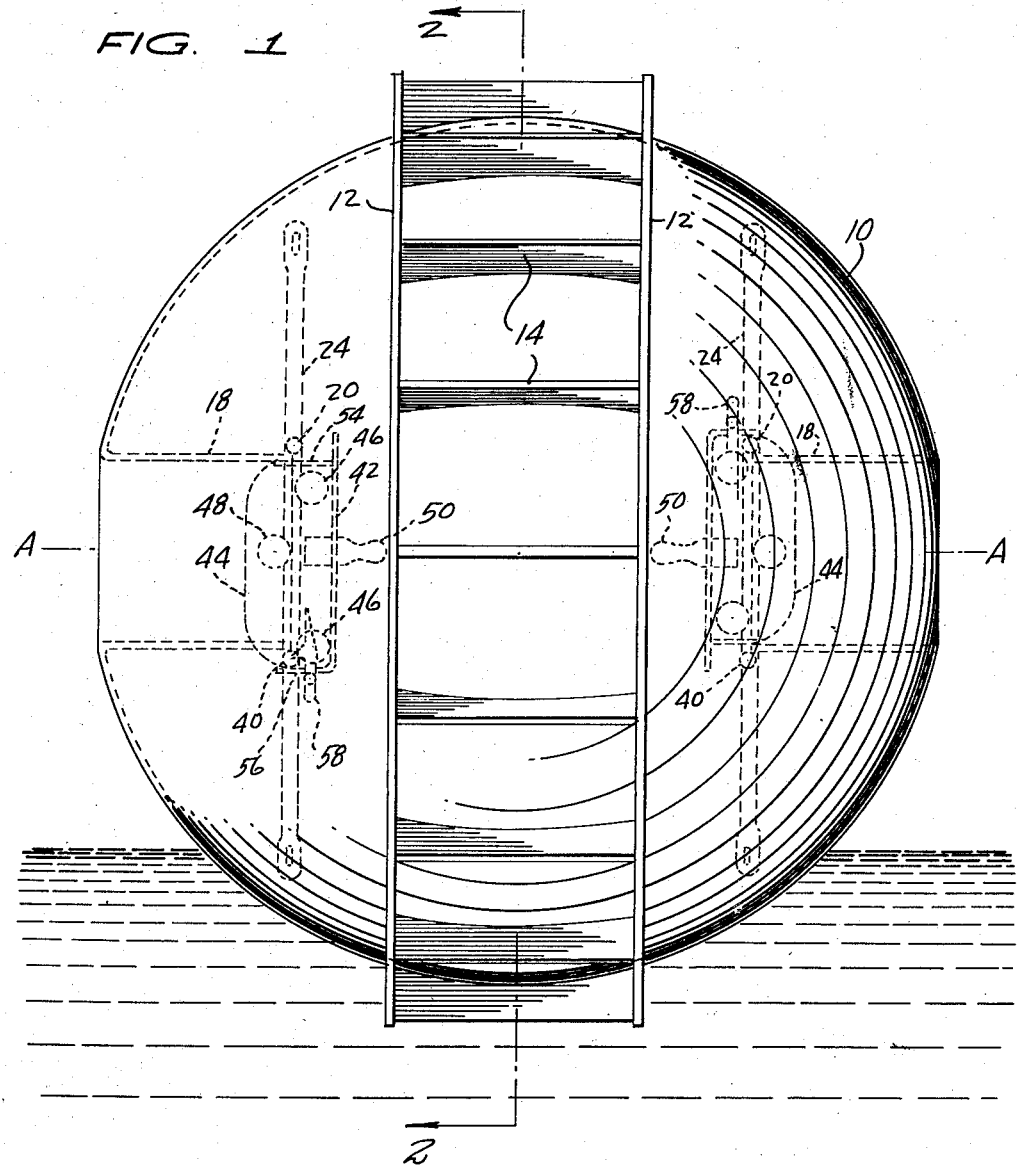

Referring to the drawings in detail, the reference numeral 10 designates a spherical hull, which is formed of a transparent material.

Figure 2:
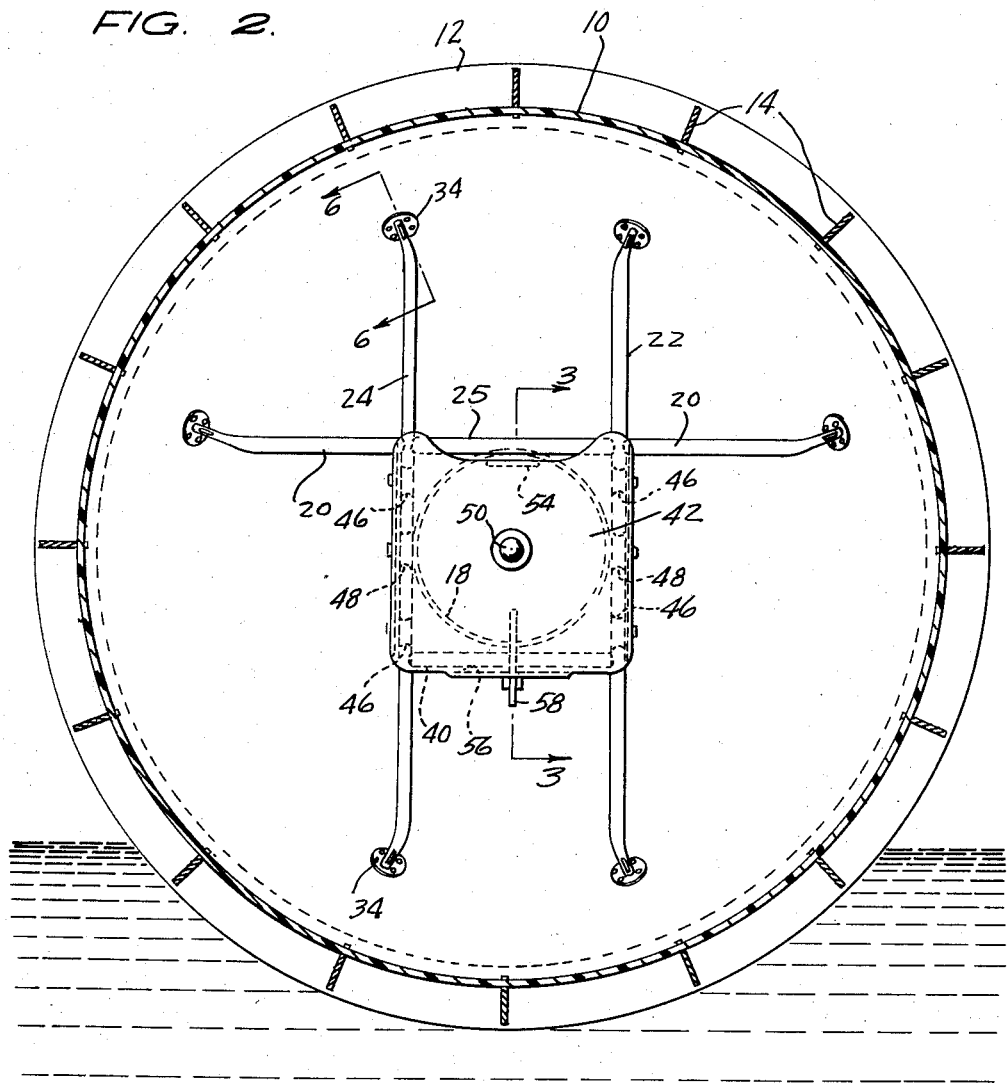
Figure 2 is a sectional view in a plane lying diametrally of the vessel on line 2—2 of Figure 1.

Secured to and extending continuously about the hull exteriorly thereof, are identical, parallel rings 12, 12 between which are connected fins or blades 14 projecting radially of the sphere as shown in Figure 2. The rings lie in planes paralleling and equidistantly spaced from a plane that lies diametrically of the hull on the section line 2—2 of Figure 1.

Since the sphere is substantially hollow, it will be buoyantly supported upon the water in the manner shown in Figures 7–10, and when positioned as in Figures 9 and 10, will be disposed in positions such that the fins or blades 14 will cause motion of the sphere in a selected direction, responsive to rotation of the sphere.

At diametrically opposite locations, the hull is formed with openings, and extending inwardly of the hull from the edges of the openings are tubular members providing hatchways 18, extending inwardly far enough to bring their inner openings above the free water line when the vessel (or hull) is loaded to capacity, regardless of the orientation of said vessel. With suitable materials and proportions thereof, enough space remains for the user to stand upright within the hull between the hatchways as shown in Figure 10.

The hatchways are coaxially aligned, on a major diameter A—A (see Figure 1) extending normally to a plane paralleling the blade support rings 12 and intersecting the blades medially between opposite ends thereof, that is, the cutting plane defined by the section line 2—2 in Figure 1. The hatchways are of a diameter sufficient to permit a person using the device to crawl therethrough in the manner shown in Figures 1 and 2.

Coaxially aligned with one another (see Figure 2) on a line extending tangentially of the hatchways at the inner ends of the hatchways, are brace bars 20, 20 connected fixedly to track bars 22, 24 that are extended in perpendicular relation to the brace bars. Fixedly connected between the track bars 22, 24 is an intermediate brace bar 25, coaxial with the brace bar 20. It will be understood, in this connection, that the construction now described, having reference to the brace and track bars, is identical but opposite at the inner end of each hatchway, so the description of the structure of one hatchway and of the track and closure plate means associated therewith will be considered as sufficient for the other hatchway.

At their opposite ends, the track bars 22, 24 are formed with relatively short extensions that are flattened and are extended obliquely to the length of the associated track bars. As shown in Figure 6, the flattened extensions, designated at 26, are formed with slots 28. Each flattened extension is disposed in contact with a triangular support 30 and held in fixed relationship thereto by means of a through bolt 36. Each support 30 has a circular base flange 31 apertured for cap screws 32 which engage threaded holes in pad 34 which, in turn, is fastened to the inner surface of the sphere (or hull) by cement 38.

Referring now to Figure 2, extending in parallel relation to and coextensive in length with the intermediate brace bar 25 is a brace bar 40, also connected fixedly between the track bars 22, 24 respectively and disposed diametrically opposite the brace bar 25 at the inner end of the associated, tubular hatch 18.

Adpted to close the inner end of each hatch is a flat, generally rectangular closure plate 42 integrally formed at opposite sides thereof with side flanges 44, 44 on which are rotatably mounted peripherally grooved rollers 46, 48. A single roller 48 may be provided upon each flange 44, rolling upon the associated track bar, while a pair of rollers 46 may be provided upon each flange, with the roller 48 disposed between the rollers 46 as shown in Figure 4, and with the rollers 46 rolling upon the opposite side of the associated track bar.

Centrally secured to each closure plate 42 is a handle 50, which is preferably rotatable upon its associated plate, so that the handle need not turn when the hull is being rotated during use. The handles 50 of the respective closure plates, when said plates are in their hatch-closing positions, are aligned with one another coaxially, along the line A—A of Figure 1.

Projecting outwardly from the respective closure plates, in alignment with the handles, are support blocks 52 for the spindles of the handles.

The closure plates, due to the rollable supporting thereof upon the respective track bars, are mounted for movement between hatch-opening and hatch-closing positions shown in Figures 4 and 3 respectively. This movement of the closure plates between their opposite extreme positions is limited by end flanges 54, 56 projecting out of the planes of the bodies of the closure plates toward the outer ends of the hatches 18. The flange 54 is adapted to limit movement of each closure plate beyond a hatch-closing position, while flange 56 is adapted to cooperate with flange 54 when the closure plates are moved in this direction. In other words, when the closure plate is moved to a hatch-closing position as in Figure 3, flange 54 will engage against the wall of the associated hatch 18, while flange 56 will engage against the brace bar 40.

The flange 54 also serves as a stop limiting the movement of the closure plate beyond its full open position shown in Figure 4, the flange 54 now engaging the side wall of the associated hatch 18 at a location diametrically opposite that at which flange 54 engages said side wall when the closure plate is moved to its hatch-closing position.

The flange 56 of the closure plate is formed with an opening, and extending through said opening is a latch bar 58 pivoted at 60 upon ears projecting from the flange 56. The latch bar 58, at a location between the flanges 54, 56 has a pointed extension 62, and adjacent said extension 62 there is provided a laterally projecting, triangular nose 64 adapted to seat in a latching recess 66 of the cross bar 40.

As will be noted from Figure 1, the latches 58 of the respective hatches are oppositely arranged, that is, while they are in a common plane including the line A—A of Figure 1, they are at opposite sides of said line.

Each latch bar is provided with a spring 67, normally biasing the bar to a latching position.

It will be observed that the nose 64, being of triangular formation, includes a cam surface so that if the closure plate is shifted from its open, Figure 4 position to its closed, Figure 3 position, as it approaches its Figure 3 position the sloped surface of the nose 64 of the latch bar will be engaged by the cross bar 40, causing the latch bar to be pivoted in a clockwise direction in Figure 4 to pass the cross bar 40, against the restraint of the spring 67. As soon as the nose of the latch bar moves past the cross bar 40, the spring 67, expanding, will cause the nose to engage over the cross bar, within the latching recess 66, thus holding the closure plate in its hatch-closing position.

It will further be noted that the opposite end portions of the latch bar, when the closure plate is in its closed position, are accessible from both within and without the sphere. In other words, the pointed extension 62 constitutes a handle at one end of the latch bar, which can be pushed by a hand or a stick through the hatch 18, from a location exteriorly of the sphere, thus to manually rock the latch bar clockwise in Figure 3 out of engagement with cross bar 40. At the same time, one within the hull can unlatch the closure plate by grasping the other end of the latch bar, which also constitutes a handle, and again rocking the latch bar in a clockwise direction.

It is important to note that all the components of the structure are disposed in symmetrical relation, so that the center of gravity falls substantially upon the geometric center of the hull except when one of the entrance tubes or hatches is uncovered as when one is entering the device. This will be noted to particular advantage from Figure 1, in which it will be seen that at opposite sides of the plane 2—2, all components are identical but opposite to one another within the structure, this applying as well to the externally located components 12, 14.

Still further, it will be observed that the annular rings 12 not only serve to brace the connection of the fins or blades 14 to the hull, but also provide a rolling support for the hull when it is out of water, so that the hull can be rolled upon the land toward or away from the water without damage to the hull surface, since the ground will be contacted by the outer-peripheries of the rings 12.

In use of the vessel, it is preferably first placed in the water, where is can be positioned easily for the purpose of being entered (see Figure 7). To enter the hull, one preferably stands upon the bottom, and from this position lifts himself into a position such as illustrated in Figure 8. As previously noted, the entrance tube or hatch extends inwardly far enough to locate its inner opening above the free water line with the vessel loaded to capacity, regardless of the orientation of the vessel.

After entering the hull, one places both feet on the inside surface of the hull and shifts position until the hull is floating in the manner shown in Figure 9, that is, is in a position in which the major diameter A—A extends horizontally, transversely of the path in which the device is to be moved when being propelled forwardly or rearwardly. The diameter A—A constitutes the axis about which the device will turn, and the paddles or blades 14 extend into the water under these circumstances, due to the location of the rings 12 in planes normal to the axis A—A. In other words, the paddle wheel defined by the rings 12 and blades 14 may be considered as being disposed generally in a vertical plane during the forward or rearward propulsion of the vessel.

The user now returns the closure plate 42 of the hatch through which he entered to a closed position, and grasps the respective handles 50. The handles 50 provide a means for controlling the relationship between the center of buoyancy of the sphere and the center of gravity of the rider. Thus, by a forward walking motion (see Figure 9) an action which involves the exertion of a backard force upon the handles, the hull will revolve in the direction of the arrows shown in Figure 9, due to the torque generated between the force of buoyancy and the walker's efforts to move his center of gravity in a forward direction.

The rotatable movement of the sphere about the axis A—A will now be translated into linear motion by means of the fins 14, which engage the water and push the sphere in the direction of the reactive force so generated.

The grasping of the handles also permits the rider to tilt the sphere laterally toward one or the other side of the rider, that is, the rider can tilt the axis or major diameter A—A out of the horizontal while the walking motion is occurring. Under these circumstances, instead of lying in a generally vertical plane as in Figure 10, the paddle wheel will be tilted into a plane slightly inclined from the vertical. This action translates rotatable movement of the sphere into a curvilinear rather than a rectilinear motion, thus permitting the walker to direct the sphere and control its progress at will, turning to left or right whichever is desired.

A reverse of the above described actions will permit backward propulsion, that is, "walking backward" according to the desires of the user, either along a straight or curved path.

The unobstructed area of the transparent hull above the water's surface permits the walker to observe the orientation of the sphere with respect to the shore and other visible objects, thus providing a basis for judging the desirability of a change in direction.

It will be noted, further, that the unobstructed area of the hull that is below the water surface constitutes a mobile window for observation of marine life, because it eliminates surface reflection and refraction which ordinarily interfere with observations of this type. Thus, the device is adapted for observing life and landscapes below the surface without additional equipment and without the danger or hazards usually associated with the observation of submarine life. No more energy is required than that required for walking leisurely, and a considerable area of the bottom can be observed during the forward motion of the vessel.

One can, further, use the vessel for fishing. Under these circumstances, it would be rotated to a position as in Figure 8, and with a closure plate open, one may seat himself upon the plate and fish through the hatch 18. The enjoyment of the fishing is enhanced due to the fact that the quarry is fully observed through the area of the hull that is disposed below the surface of the water.

It will be understood that various compartments may be incorporated in the structure for the purpose of carrying towels, fishing gear, refreshments, etc. These would be fastened to the track bars and other structural members, and again, would be disposed symmetrically with respect to the plane denoted by the section line 2—2.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A water craft comprising a spherical, hollow hull; diametrically opposed tubes extending radially of the hull and aligned coaxially, on an axis extending diametrically of the hull, said tubes providing entrance passages for a user; and a paddle wheel girdling the hull for propelling the same in a selected direction, said axis being normal to a plane bisecting the paddle wheel and paralleling the opposite sides of the paddle wheel, thus to effect rotation of the hull about said axis by walking of the user upon the inner surface thereof.

2. A water craft comprising a spherical, hollow hull; diametrically opposed tubes extending radially inwardly of the hull and aligned coaxially, on an axis extending diametrically of the hull, said tubes providing entrance hatches for a user; and a paddle wheel comprising a pair of rings rigid with and extending circumferentially of the hull exteriorly thereof, said wheel including blades connected between the rings and extending outwardly from the hull, said axis being normal to a plane lying medially between and paralleling the respective rings, thus to propel the hull in a selected direction responsive to rotation of the same about said axis effected by walking of the user upon the inner surface thereof.

3. A water craft comprising a spherical, hollow hull; diametrically opposed tubes extending radially inwardly of the hull and aligned coaxially, on an axis extending diametrically of the hull, said tubes providing entrance hatches for a user; a padle wheel comprising a pair of rings rigid with and extending circumferentially of the hull exteriorly thereof, said wheel including blades connected between the rings and extending outwardly from the hull, said axis being normal to a plane lying medially between and paralleling the respective rings, thus to propel the hull in a selected direction responsive to rotation of the same about said axis effected by walking of the user upon the inner surface thereof; and closure means mounted within the hull at the inner ends of the tubes for movement between positions closing and opening the tubes respectively.

4. A water craft comprising a spherical, hollow hull; diametrically opposed tubes extending radially inwardly of the hull and aligned coaxially, on an axis extending diametrically of the hull, said tubes providing entrance hatches for a user; a paddle wheel comprising a pair of rings rigid with and extending circumferentially of the hull exteriorly thereof, said wheel including blades connected between the rings and extending outwardly from the hull, said axis being normal to a plane lying medially between and paralleling the respective rings, thus to propel the hull in a selected direction responsive to rotation of the same about said axis effected by walking of the user upon the inner surface thereof; track bars secured to the hull within the same and extending normally to said axis; and closure plates riding on said track bars between opposite extreme positions in one of which said plates close the respective tubes at their inner ends and in the other of which the plates are shifted substantially clear of the inner ends of the tubes to open the same.

5. A water craft comprising a spherical, hollow hull; diametrically opposed tubes extending radially inwardly of the hull and aligned coaxially, on an axis extending diametrically of the hull, said tubes providing entrance hatches for a user; a paddle wheel comprising a pair of rings rigid with and extending circumferentially of the hull exteriorly thereof, said wheel including blades connected between the rings and extending outwardly from the hull, sid axis being normal to a plane lying medially between and paralleling the respective rings, thus to propel the hull in a selected direction responsive to rotation of the same about said axis effected by walking of the user upon the inner surface thereof; track bars secured to the hull within the same and extending normally to said axis; closure plates riding on said track bars between opposite extreme positions in one of which said plates close the respective tubes at their inner ends and in the other of which the plates are shifted substantially clear of the inner ends of the tubes to open the same; and handles secured to the respective closure plates and extending toward one another from the closure plates, so as to be grasped by a user standing upright within the hull between the closure plates during the propulsion of the hull, said handles in the tube-closing positions of the closure plates being aligned coaxially, on said axis.

6. A water craft comprising a spherical, hollow hull; diametrically opposed tubes extending radially inwardly of the hull and aligned coaxially, on an axis extending diametrically of the hull, said tubes providing entrance hatches for a user; a paddle wheel comprising a pair of rings rigid with and extending circumferentially of the hull exteriorly thereof, said wheel including blades connected between the rings and extending outwardly from the hull, said axis being normal to a plane lying medially between and paralleling the respective rings, thus to propel the hull in a selected direction responsive to rotation of the same about said axis effected by walking of the user upon the inner surface thereof; track bars secured to the hull within the same and extending normally to said axis; closure plates riding on said track bars between opposite extreme positions in one of which said plates close the respective tubes at their inner ends and in the other of which the plates are shifted substantially clear of the inner ends of the tubes to open the same; handles secured to the respective closure plates and extending toward one another from the closure plates, so as to be grasped by a user standing upright within the hull between the closure plates during the propulsion of the hull, said handles in the tube-closing positions of the closure plates being aligned coaxially, on said axis; and latch means carried by the respective closure plates, the track bars having brace bars engageable by said latch means in the tube-closing positions of the closure plates.

7. A water craft comprising a spherical, hollow hull; diametrically opposed tubes extending radially inwardly of the hull and aligned coaxially, on an axis extending diametrically of the hull, said tubes providing entrance hatches for a user; a paddle wheel comprising a pair of rings rigid with and extending circumferentially of the hull exteriorly thereof, said wheel including blades connected between the rings and extending outwardly from the hull, said axis being normally to a plane lying medially between and paralleling the respective rings, thus to propel the hull in a selected direction responsive to rotation of the same about said axis effected by walking of the user upon the inner surface thereof; track bars secured to the hull within the same and extending normally to said axis; closure plates riding on said track bars between opposite extreme positions in one of which said plates close the respective tubes at their inner ends and in the other of which the plates are shifted substantially clear of the inner ends of the tubes to open the same; handles secured to the respective closure plates and extending toward one another from the closure plates, so as to be grasped by a user standing upright within the hull between the closure plates during the propulsion of the hull, said handles in the tube-closing positions of the closure plates being aligned coaxially, on said axis; and latch means carried by the respective closure plates, the track bars having brace bars engageable by said latch means in the tube-closing positions of the closure plates, comprising latch bars pivoted upon the respective closure plates, said latch bars including laterally projecting noses engaging the brace means, the latch bars, in their latching positions, having one end portion extending within the hull so as to be accessible to said user and having an opposite end portion projecting into the associated tube so as to be accessible from without the hull.

References Cited in the file of this patent

UNITED STATES PATENTS

| | | |
|---|---|---|
| 396,486 | Henry | Jan. 22, 1889 |
| 1,804,972 | DeMarchi | May 12, 1931 |
| 2,104,636 | Burcham | Jan. 4, 1938 |
| 2,267,254 | Reilley | Dec. 23, 1941 |

FOREIGN PATENTS

| | | |
|---|---|---|
| 177,676 | Great Britain | Apr. 6, 1922 |
| 500,989 | Great Britain | Feb. 20, 1939 |
| 682,951 | Germany | Oct. 26, 1939 |